US009857965B1

(12) United States Patent
Starner et al.

(10) Patent No.: US 9,857,965 B1
(45) Date of Patent: Jan. 2, 2018

(54) RESOLUTION OF DIRECTIONAL AMBIGUITY ON TOUCH-BASED INTERFACE GESTURE

(75) Inventors: Thad Eugene Starner, Mountain View, CA (US); Nirmal Patel, Mountain View, CA (US); Adrian Wong, Mountain View, CA (US); Michael Patrick Johnson, Sunnyvale, CA (US)

(73) Assignee: Google Inc., Mountain View, CA (US)

( * ) Notice: Subject to any disclaimer, the term of this patent is extended or adjusted under 35 U.S.C. 154(b) by 484 days.

(21) Appl. No.: 13/344,643

(22) Filed: Jan. 6, 2012

(51) Int. Cl.
*G06F 3/0485* (2013.01)

(52) U.S. Cl.
CPC .... *G06F 3/0485* (2013.01); *G06F 2203/0339* (2013.01)

(58) Field of Classification Search
None
See application file for complete search history.

(56) References Cited

U.S. PATENT DOCUMENTS

| | | | |
|---|---|---|---|
| 2006/0238495 A1* | 10/2006 | Davis | 345/156 |
| 2007/0052672 A1 | 8/2007 | Ritter et al. | |
| 2008/0082940 A1* | 4/2008 | Morris | G06F 3/0485 715/786 |
| 2010/0117971 A1* | 5/2010 | Chen | 345/173 |
| 2010/0149073 A1* | 6/2010 | Chaum et al. | 345/8 |
| 2010/0231546 A1* | 9/2010 | Digon | G06F 3/0362 345/173 |
| 2011/0088086 A1* | 4/2011 | Swink | G06F 3/04883 726/7 |
| 2011/0185208 A1* | 7/2011 | Iwamoto | G06F 1/3203 713/323 |
| 2011/0194029 A1 | 8/2011 | Hermann et al. | |
| 2011/0231757 A1 | 9/2011 | Haddick et al. | |
| 2011/0300831 A1* | 12/2011 | Chin | 455/411 |
| 2012/0311499 A1* | 12/2012 | Dellinger et al. | 715/835 |
| 2013/0173925 A1* | 7/2013 | Yen | G06F 21/32 713/186 |

FOREIGN PATENT DOCUMENTS

WO 2011140061 11/2011

* cited by examiner

*Primary Examiner* — Amr Awad
*Assistant Examiner* — Donna Lui
(74) *Attorney, Agent, or Firm* — McDonnell Boehnen Hulbert & Berghoff LLP

(57) ABSTRACT

Methods and systems involving resolution of directional ambiguity between a graphical display and a touch-based user-interface are disclosed herein. An example system may be configured to: (a) cause a visual depiction of a first reference marker on a graphical display; (b) receive first input data indicating an initial touch input on a touch-based user-interface, where the initial touch input corresponds to an input-direction path having a first end and a second end, and where the touch input corresponds to movement of the input-direction path; (c) associate movement of the first reference marker with subsequent touch inputs; (d) receive second input data indicating a subsequent touch input; and (e) cause a visual depiction of movement of a second reference marker.

24 Claims, 13 Drawing Sheets

RESOLUTION OF DIRECTIONAL AMBIGUITY ON TOUCH-BASED INTERFACE GESTURE

BACKGROUND

Unless otherwise indicated herein, the materials described in this section are not prior art to the claims in this application and are not admitted to be prior art by inclusion in this section.

Computing devices such as personal computers, laptop computers, tablet computers, cellular phones, and countless other types of Internet-capable devices are increasingly prevalent in numerous aspects of modern life. As computers become progressively more integrated with users' every day life, the convenience, efficiency, and intuitiveness of the user-interfaces by which users interact with computing devices becomes progressively more important.

A user-interface may include combinations of hardware and software that enable the user to, among other things, interact with a computing system. One example of a modern user-interface is a "pointing device" that may allow a user to input spatial data into a computing system. The spatial data may be received and processed by the computing system, and may ultimately be used by the computing system as a basis for executing certain computing functions.

One type of pointing device may, generally, be based on a user touching a surface. Examples of common such pointing devices include a touch-based interface, which may include a TouchPad and a touch screen. Other examples of pointing devices based on a user touching a surface may exist as well. In some arrangements, the surface is a flat surface that can detect contact with the user's finger. For example, the surface may include electrode-sensors, capacitive sensors, resistive sensors, and/or other sensors that are arranged to transmit, to the computing system, data that indicated the pressure and direction of movement of the finger on the surface.

The computing system may be equipped with a graphical display that may, for example, provide a visual depiction of a graphical pointer that moves in accordance with the movement of the pointer. The graphical display may also provide a visual depiction of other objects that the user may manipulate, including, for example, a visual depiction of a graphical user-interface. The user may refer to such a graphical user-interface with inputting data. Implementations of a TouchPad may involve a graphical display that is physically remote from the TouchPad. However, a touchscreen is typically characterized by a TouchPad embedded into a graphical display such that users may interact directly with a visual depiction of the graphical user-interface, and/or other elements displayed on the graphical display, by touching the graphical display itself.

Often, a TouchPad may be outside of the user's line of vision. For example, the TouchPad may be attached to an HMD in a position that is not parallel with the graphical display of the HMD. Thus, directional ambiguity may occur between user inputs and corresponding manipulations of a graphical interface provided via the graphical display of the HMD. That is, it may not be clear whether touch-input movements on the TouchPad (e.g., those in a forward/backward direction) are intended to represent interactions with the graphical interface to the left, or to the right (or in some other direction). Such directional ambiguity may result in poor user experience. Thus, an improvement to help resolve such directional ambiguity is desired.

SUMMARY

The systems and methods described herein may help provide for more convenient, efficient, and/or intuitive techniques for resolving directional ambiguity between a graphical interface provided by a graphical display and a user-interface based on a user's wake-up gesture (i.e., the users first, or "initiating interaction" with the user-interface). For example, the techniques described below may help define a user's preferred direction of movement upon initiating an interaction with the user-interface.

In one aspect, a system is provided. The system may include: (1) a processor; (2) a non-transitory computer readable medium; and (3) program instructions stored on the non-transitory computer readable medium and executable by the processor to cause a computing device to: (a) cause a visual depiction of a first reference marker on a graphical display; (b) receive first input data indicating an initial touch input on a touch-based user-interface, where the initial touch input corresponds to an input-direction path having a first end and a second end, and where the touch input corresponds to one of (i) movement from the first end to the second end of the input-direction path, or (ii) movement from the second end to the first end of the input-direction path; (c) associate movement of the first reference marker from a first end to a second end of the graphical display with one of (i) subsequent touch inputs from the first end to the second end of the input path if the initial touch input was from the first end to the second end of the input path, or (ii) subsequent touch inputs from the second end to the first end of the input path if the initial touch input was from the second end to the first end of the input path; (d) receive second input data indicating a subsequent touch input; and (e) cause a visual depiction of movement of a second reference marker based on at least (i) the association of movement of the first reference marker and (ii) the subsequent touch input.

In a further aspect, a non-transitory computer-readable medium is provided. The non-transitory computer-readable medium may include instructions including instructions for: (a) causing a visual depiction of a first reference marker on a graphical display; (b) receiving first input data indicating an initial touch input on a touch-based user-interface, where the initial touch input corresponds to an input-direction path having a first end and a second end, and where the touch input corresponds to one of (i) movement from the first end to the second end of the input-direction path, or (ii) movement from the second end to the first end of the input-direction path; (c) associating movement of the first reference marker from a first end to a second end of the graphical display with one of (i) subsequent touch inputs from the first end to the second end of the input path if the initial touch input was from the first end to the second end of the input path, or (ii) subsequent touch inputs from the second end to the first end of the input path if the initial touch input was from the second end to the first end of the input path; (d) receiving second input data indicating a subsequent touch input; and (e) causing a visual depiction of movement of a second reference marker based on at least (i) the association of movement of the first reference marker and (ii) the subsequent touch input.

In yet a further aspect, a computer-implemented method is provided. The method may involve: (a) causing a visual depiction of a first reference marker on a graphical display;

(b) receiving first input data indicating an initial touch input on a touch-based user-interface, where the initial touch input corresponds to an input-direction path having a first end and a second end, and where the touch input corresponds to one of (i) movement from the first end to the second end of the input-direction path, or (ii) movement from the second end to the first end of the input-direction path; (c) associating movement of the first reference marker from a first end to a second end of the graphical display with one of (i) subsequent touch inputs from the first end to the second end of the input path if the initial touch input was from the first end to the second end of the input path, or (ii) subsequent touch inputs from the second end to the first end of the input path if the initial touch input was from the second end to the first end of the input path; (d) receiving second input data indicating a subsequent touch input; and (e) causing a visual depiction of movement of a second reference marker based on at least (i) the association of movement of the first reference marker and (ii) the subsequent touch input.

In yet a further aspect still, a head-mounted display (HMD) is provided. The HMD may include means for: (a) causing a visual depiction of a first reference marker on a graphical display; (b) receiving first input data indicating an initial touch input on a touch-based user-interface, where the initial touch input corresponds to an input-direction path having a first end and a second end, and where the touch input corresponds to one of (i) movement from the first end to the second end of the input-direction path, or (ii) movement from the second end to the first end of the input-direction path; (c) associating movement of the first reference marker from a first end to a second end of the graphical display with one of (i) subsequent touch inputs from the first end to the second end of the input path if the initial touch input was from the first end to the second end of the input path, or (ii) subsequent touch inputs from the second end to the first end of the input path if the initial touch input was from the second end to the first end of the input path; (d) receiving second input data indicating a subsequent touch input; and (e) causing a visual depiction of movement of a second reference marker based on at least (i) the association of movement of the first reference marker and (ii) the subsequent touch input.

These, as well as other aspects, advantages, and alternatives, will become apparent to those of ordinary skill in the art by reading the following detailed description, with reference where appropriate to the accompanying drawings.

DETAILED DESCRIPTION

Figure 1A:
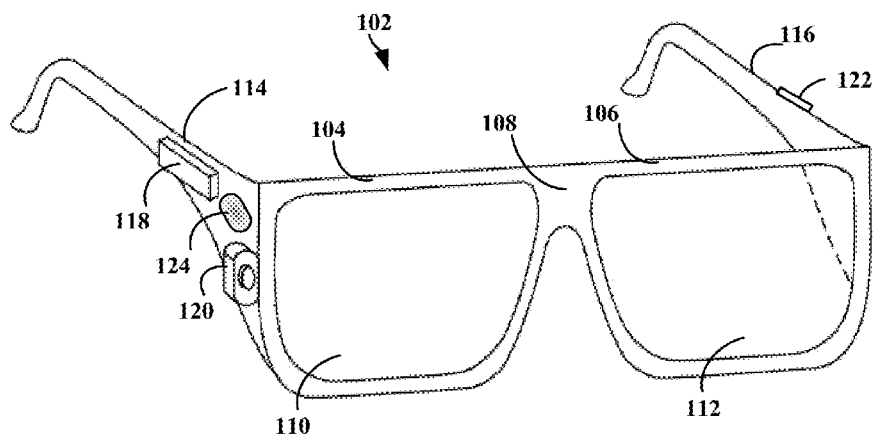
FIG. 1A shows an example system for receiving, transmitting, and displaying data in accordance with an example embodiment.

In the following detailed description, reference is made to the accompanying figures, which form a part thereof. In the figures, similar symbols typically identify similar components, unless context dictates otherwise. The illustrative embodiments described in the detailed description, figures, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the figures, can be arranged, substituted, combined, separated, and designed in a wide variety of different configurations, all of which are contemplated herein.

1. OVERVIEW

An example embodiment involves a wearable computer that may be configured to receive input data indicating touch input by a user on a touch-based user-interface. The user-interface may be communicatively coupled to a graphical display. The graphical display may be provided as part of a head-mounted display (HMD). In response to the touch input, the graphical display may depict the touch input on the user-interface by, for example, moving objects across the display, such as a cursor. Thus, the user may be able to visualize the movement of the touch input on the user-interface by looking at the graphical display located on the HMD.

In some circumstances, the position of the user-interface may not be parallel to the graphical display. For instance, in an example embodiment, the user-interface may be orthogonally positioned in relation to the graphical display. Therefore, movement on the graphical display that appears "left" to "right" or "right" to "left," may be understood by the user to correspond to either a "front" to "back" or "back" to "front" touch-input movement on the user-interface. Thus, different users may have different preferences for the direction of movement on the graphical display based on the direction of the touch input on the user-interface.

According to the disclosure herein, the user may customize which direction on the user-interface the computing system should associate with a "left" to "right" or "right" to "left" movement on the graphical display during the wake-up gesture which may, for example, "unlock" the computing system. For example, during the wake-up gesture, a reference marker on the screen may be limited to a "left" to "right" movement. When the user chooses to unlock the device, the user may perform a swiping motion on the user-interface. In an example embodiment, the swiping motion may be "front" to "back" on the user-interface. Accordingly, the computing system may then associate subsequent "front" to "back" touch-input movement on the user-interface with a "left" to "right" movement of an object on the graphical display. Alternatively, the swiping motion may be "back" to "front." Accordingly, the computing system may then associate subsequent "back" to "front" touch-input movement on the user-interface with a "left" to "right" movement of an object on the graphical display. Other suitable directional movements may be used as well.

It should be understood that the above example is an example embodiment, is provided for illustrative purposes, and is just one of many possible example embodiments. Therefore, the above example should not be taken to be limiting.

2. EXAMPLE SYSTEM AND DEVICE ARCHITECTURE

FIG. 1A illustrates an example system 300 for receiving, transmitting, and displaying data. The system 300 is shown in the form of a wearable computing device. While FIG. 1A illustrates a head-mounted device 102 as an example of a wearable computing device, other types of wearable computing devices could additionally or alternatively be used. As illustrated in FIG. 1A, the head-mounted device 102 has frame elements including lens-frames 104, 106 and a center frame support 108, lens elements 110, 112, and extending side-arms 114, 116. The center frame support 108 and the extending side-arms 114, 116 are configured to secure the head-mounted device 102 to a user's face via a user's nose and ears, respectively.

Each of the frame elements 104, 106, and 108 and the extending side-arms 114, 116 may be formed of a solid structure of plastic and/or metal, or may be formed of a hollow structure of similar material so as to allow wiring and component interconnects to be internally routed through the head-mounted device 102. Other materials may be possible as well.

One or more of each of the lens elements 110, 112 may be formed of any material that can suitably display a projected image or graphic. Each of the lens elements 110, 112 may also be sufficiently transparent to allow a user to see through the lens element. Combining these two features of the lens elements may facilitate an augmented reality or heads-up display where the projected image or graphic is superimposed over a real-world view as perceived by the user through the lens elements 110, 112.

The extending side-arms 114, 116 may each be projections that extend away from the lens-frames 104, 106, respectively, and may be positioned behind a user's ears to secure the head-mounted device 102 to the user. The extending side-arms 114, 116 may further secure the head-mounted device 102 to the user by extending around a rear portion of the user's head. Additionally or alternatively, for example, the system 100 may connect to or be affixed within a head-mounted helmet structure. Other possibilities exist as well.

The HMD 102 may also include an on-board computing system 118, a video camera 120, a sensor 122, and a finger-operable TouchPad 124. The on-board computing system 118 is shown to be positioned on the extending side-arm 114 of the head-mounted device 102; however, the on-board computing system 118 may be provided on other parts of the head-mounted device 102 or may be positioned remote from the head-mounted device 102 (e.g., the on-board computing system 118 could be connected by wires or wirelessly connected to the head-mounted device 102). The on-board computing system 118 may include a processor and memory, for example. The on-board computing system 118 may be configured to receive and analyze data from the video camera 120, the sensor 122, and the finger-operable TouchPad 124 (and possibly from other sensory devices, user-interfaces, or both) and generate images for output by the lens elements 110 and 112. The on-board computing system 118 may additionally include a speaker or a microphone for user input (not shown).

The video camera 120 is shown positioned on the extending side-arm 114 of the head-mounted device 102; however, the video camera 120 may be provided on other parts of the head-mounted device 102. The video camera 120 may be configured to capture images at various resolutions or at different frame rates. Video cameras with a small form-factor, such as those used in cell phones or webcams, for example, may be incorporated into an example embodiment of the system 300

Further, although FIG. 1A illustrates one video camera 120, more video cameras may be used, and each may be configured to capture the same view, or to capture different views. For example, the video camera 120 may be forward facing to capture at least a portion of the real-world view perceived by the user. This forward facing image captured by the video camera 120 may then be used to generate an augmented reality where computer generated images appear to interact with the real-world view perceived by the user.

The sensor 122 is shown on the extending side-arm 116 of the head-mounted device 102; however, the sensor 122 may be positioned on other parts of the head-mounted device 102. The sensor 122 may include one or more of a gyroscope or an accelerometer, for example. Other sensing devices may be included within, or in addition to, the sensor 122 or other sensing functions may be performed by the sensor 122.

The finger-operable TouchPad 124 is shown on the extending side-arm 114 of the head-mounted device 102. However, the finger-operable TouchPad 124 may be positioned on other parts of the head-mounted device 102. Also, more than one finger-operable TouchPad may be present on the head-mounted device 102. The finger-operable TouchPad 124 may be used by a user to input commands. The finger-operable TouchPad 124 may sense at least one of a position and a movement of a finger via capacitive sensing, resistance sensing, or a surface acoustic wave process, among other possibilities. The finger-operable TouchPad 124 may be capable of sensing finger movement in a direction parallel or planar to the pad surface, in a direction normal to the pad surface, or both, and may also be capable of sensing a level of pressure applied to the pad surface. The finger-operable TouchPad 124 may be formed of one or more translucent or transparent insulating layers and one or more translucent or transparent conducting layers. Edges of the finger-operable TouchPad 124 may be formed to have a raised, indented, or roughened surface, so as to provide tactile feedback to a user when the user's finger reaches the edge, or other area, of the finger-operable TouchPad 124. If more than one finger-operable TouchPad is present, each finger-operable TouchPad may be operated independently, and may provide a different function.

Figure 1B:
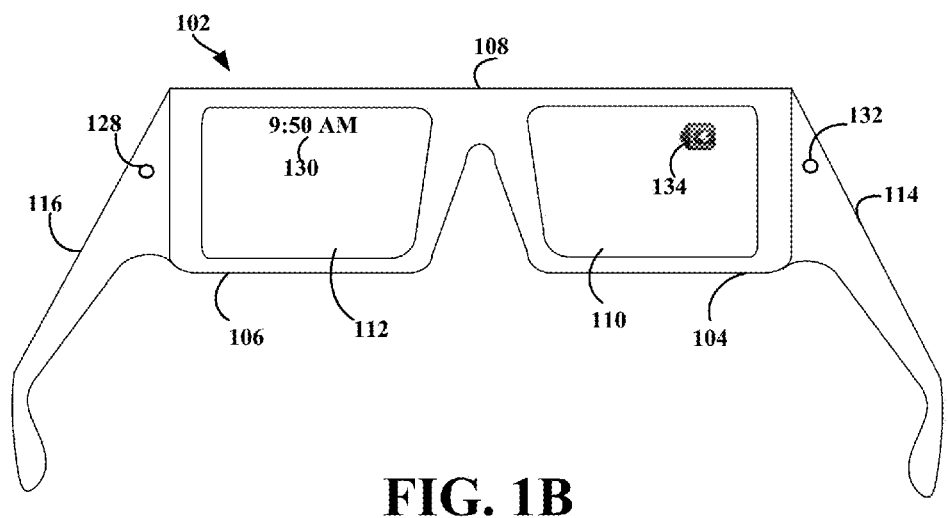
FIG. 1B shows an alternate view of the system illustrated in FIG. 1A.

FIG. 1B illustrates an alternate view of the system 300 illustrated in FIG. 1A. As shown in FIG. 1B, the lens elements 110, 112 may act as display elements. The head-mounted device 102 may include a first projector 128 coupled to an inside surface of the extending side-arm 116 and configured to project a display 130 onto an inside surface of the lens element 112. Additionally or alternatively, a second projector 132 may be coupled to an inside surface of the extending side-arm 114 and configured to project a display 134 onto an inside surface of the lens element 110.

The lens elements 110, 112 may act as a combiner in a light projection system and may include a coating that reflects the light projected onto them from the projectors 128, 132. In some embodiments, a reflective coating may be omitted (e.g., when the projectors 128, 132 are scanning laser devices).

In alternative embodiments, other types of display elements may also be used. For example, the lens elements 110, 112 themselves may include: a transparent or semi-transparent matrix display, such as an electroluminescent display or a liquid crystal display, one or more waveguides for delivering an image to the user's eyes, or other optical elements capable of delivering an in-focus near-to-eye image to the user. A corresponding display driver may be disposed within the frame elements 104, 106 for driving such a matrix display. Alternatively or additionally, a laser or light emitting diode (LED) source and scanning system could be used to draw a raster display directly onto the retina of one or more of the user's eyes. Other possibilities exist as well.

Figure 1C:
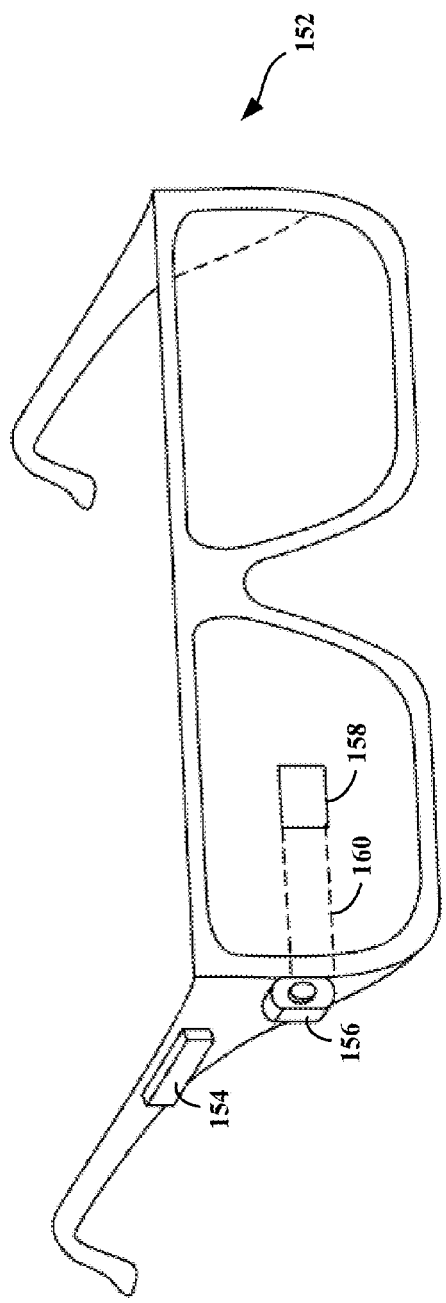
FIG. 1C shows an example system for receiving, transmitting, and displaying data in accordance with an example embodiment.

FIG. 1C illustrates an example system for receiving, transmitting, and displaying data. The system is shown in the form of a wearable computing device 152. The wearable computing device 152 may include frame elements and side-arms such as those described with respect to FIGS. 1A and 1B. The wearable computing device 152 may additionally include an on-board computing system 154 and a video camera 156, such as those described with respect to FIGS. 1A and 1B. The video camera 156 is shown mounted on a frame of the wearable computing device 152; however, the video camera 156 may be mounted at other positions as well.

As shown in FIG. 1C, the wearable computing device 152 may include a single display 158 which may be coupled to the device. The display 158 may be formed on one of the lens elements of the wearable computing device 152, such as a lens element described with respect to FIGS. 1A and 1B, and may be configured to overlay computer-generated graphics in the user's view of the physical world. The display 158 is shown to be provided in a center of a lens of the wearable computing device 152; however, the display 158 may be provided in other positions. The display 158 is controllable via the computing system 154 that is coupled to the display 458 via an optical waveguide 160.

Figure 1D:
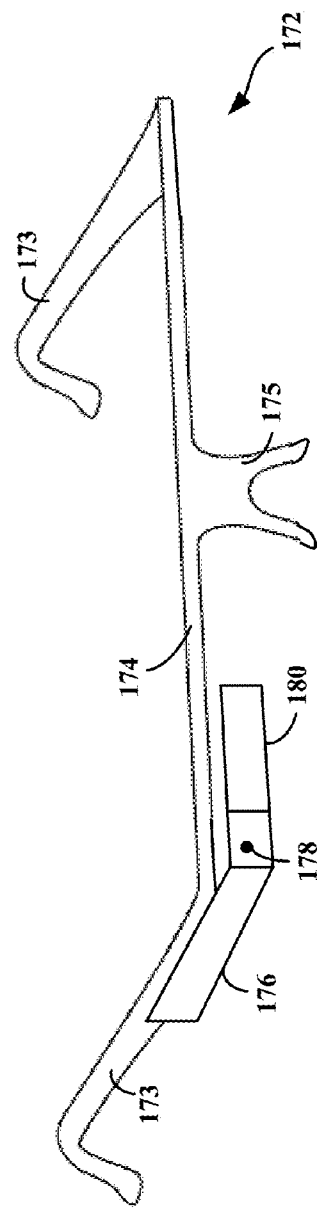
FIG. 1D shows an example system for receiving, transmitting, and displaying data in accordance with an example embodiment.

FIG. 1D illustrates an example system for receiving, transmitting, and displaying data. The system is shown in the form of a wearable computing device 172. The wearable computing device 172 may include side-arms 173, a center frame support 174, and a bridge portion with nosepiece 175. In the example shown in FIG. 1D, the center frame support 174 connects the side-arms 173. The wearable computing device 172 does not include lens-frames containing lens elements. The wearable computing device 172 may additionally include an on-board computing system 176 and a video camera 178, such as those described with respect to FIGS. 1A and 1B.

The wearable computing device 172 may include a single lens element 180 that may be coupled to one of the side-arms 173 or the center frame support 174. The lens element 180 may include a display such as the display described with reference to FIGS. 1A and 1B, and may be configured to overlay computer-generated graphics upon the user's view of the physical world. In one example, the single lens element 180 may be coupled to a side of the extending side-arm 173. The single lens element 180 may be positioned in front of or proximate to a user's eye when the wearable computing device 172 is worn by a user. For example, the single lens element 130 may be positioned below the center frame support 174, as shown in FIG. 1D.

Figure 1E:
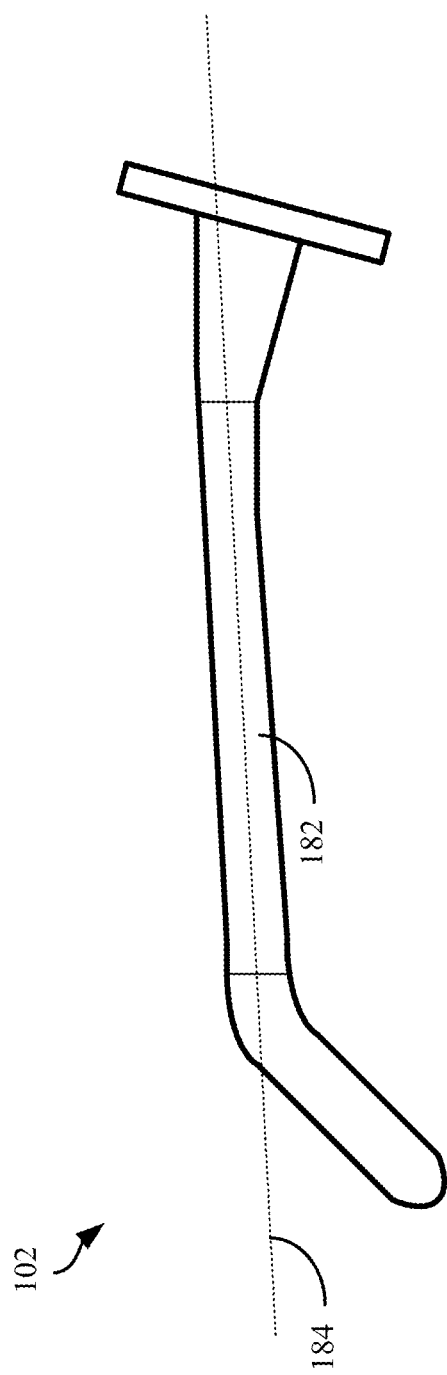
FIG. 1E shows an example system for receiving, transmitting, and displaying data in accordance with an example embodiment.

FIG. 1E depicts yet another alternate view of another example wearable computing system. More particularly, FIG. 1E depicts an alternate view of an extending side-arm. As shown, the extending side-arm is configured to include a touch sensitive interface 182, having a longitudinal axis 184, along the side arm. Touch sensitive interface 182 may be a finger-operable TouchPad 124 as described above. Generally, touch sensitive interface 182 may take on any suitable touch-based interface form including, for example, electrode-based, capacitance-based, and/or resistance-based forms, among others.

Figure 1F:
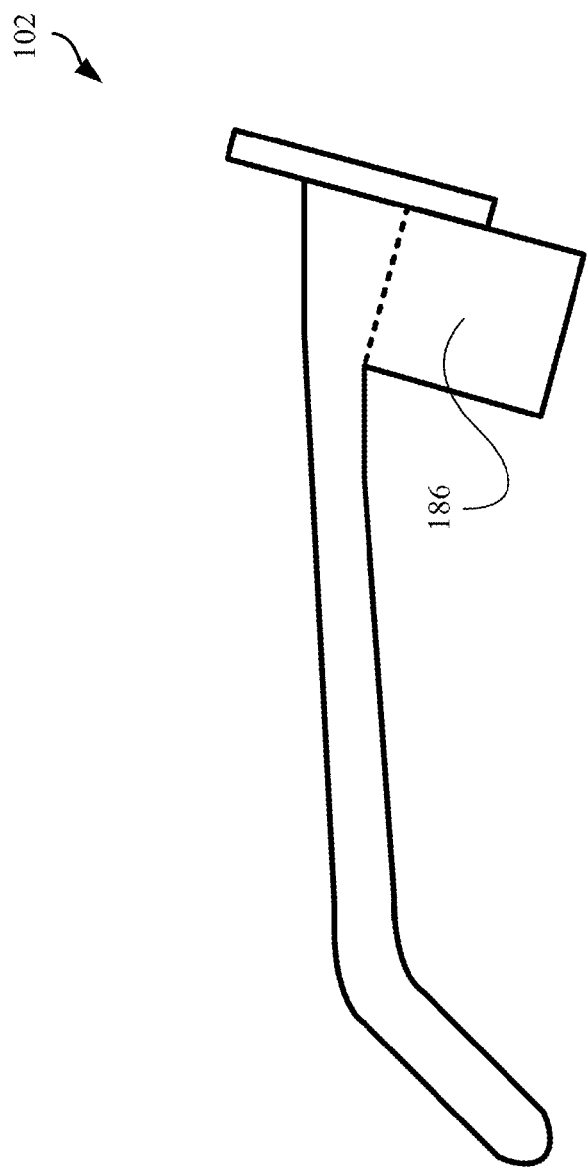
FIG. 1F shows an example system for receiving, transmitting, and displaying data in accordance with an example embodiment.

FIG. 1F depicts yet another alternate via of another example wearable computing system. More particularly, FIG. 1F depicts an alternate view of an extending side-arm. As shown, the extending side-arm is configured to include a touch sensitive interface 186, attached to the extending side-arm. Touch sensitive interface 186 may be a finger-operable TouchPad 124 as described above. Generally, touch sensitive interface 186 may take on any suitable touch-based interface form including, for example, electrode-based, capacitance-based, and/or resistance-based forms, among others.

Figure 2A:
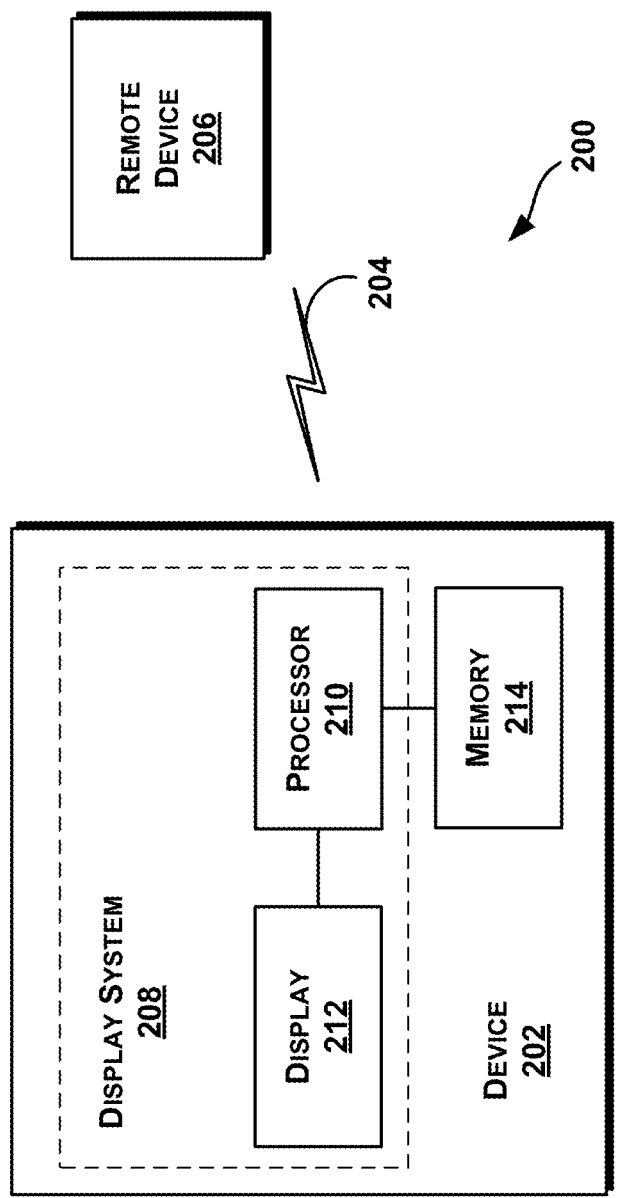
FIG. 2A shows a simplified block diagram of an example computer network infrastructure.

FIG. 2A illustrates a simplified block diagram of an example computer-network infrastructure. In one system 200, a device 202 communicates using a communication link 204 (e.g., a wired or wireless connection) to a remote device 206. Device 202 may be any type of device that can receive data and display information corresponding to or associated with the data. For example, device 202 may be a heads-up display system, such as the head-mounted devices 102, 152, or 172 described with reference to FIGS. 1A-1F.

Thus, device 202 may include display system 208 comprising a processor 210 and a display 212. Display 212 may be, for example, an optical see-through display, an optical see-around display, or a video see-through display. Processor 210 may by any type of processor, such as a microprocessor or a digital signal processor, for example. Device 202 may further include on-board data storage, such as memory 214 coupled to processor 210. Memory 214 may store software that can be accessed and executed by processor 210, for example.

Remote device 206 may be any type of computing device or transmitter including a laptop computer, a mobile telephone, a network server, etc., that is configured to transmit data to device 202. Remote device 206 and device 202 may contain hardware to enable communication link 204, such as processors, transmitters, receivers, antennas, etc.

In FIG. 2A, communication link 204 is illustrated as a wireless connection; however, wired connections may also be used. For example, communication link 204 may be a wired link via a serial bus such as a universal serial bus or a parallel bus. Such a wired connection may be a proprietary connection as well. Communication link 204 may also be a wireless connection that uses, e.g., Bluetooth® radio technology, communication protocols described in IEEE 802.11 (including any IEEE 802.11 revisions), Cellular technology (such as GSM, CDMA, UMTS, EV-DO, WiMAX, or LTE), or Zigbee® technology, among other possibilities. Remote device 206 may be accessible via the Internet and may comprise a computing cluster associated with a particular web service (e.g., social-networking, photo sharing, address book, etc.).

Figure 2B:
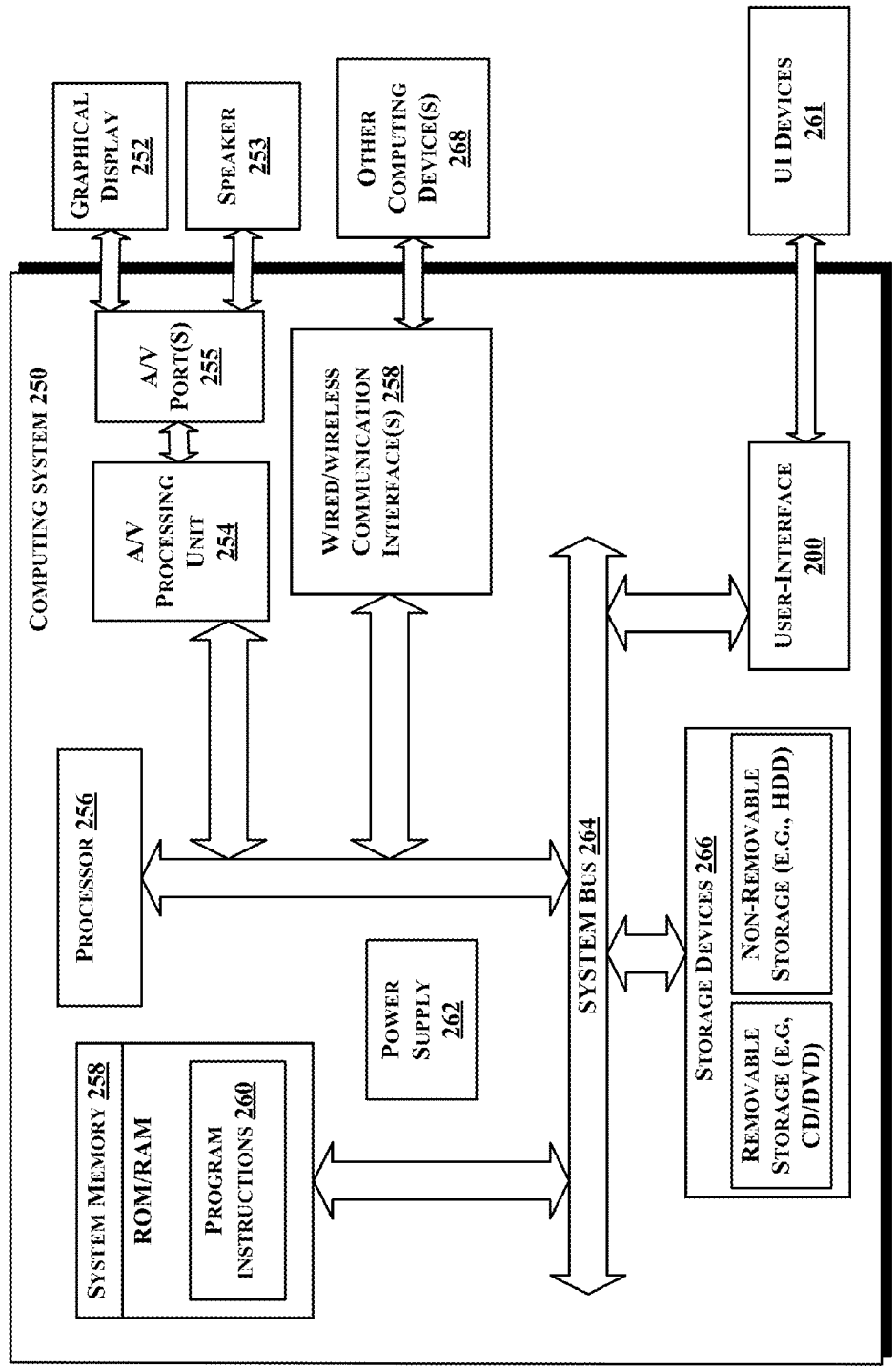
FIG. 2B shows a simplified block diagram depicting components of an example computing system.

With reference again to FIG. 1A, recall that HMD 102 may include, or may otherwise be communicatively coupled to, a computing system such as computing system 118. Such a computing system may take the form of example computing system 250 as shown in FIG. 2B. Additionally, one, or each, of device 202 and remote device 206 may take the form of computing system 250.

Computing system 250 may include at least one processor 256 and system memory 258. In an example embodiment, computing system 250 may include a system bus 264 that communicatively connects processor 256 and system memory 258, as well as other components of computing system 250. Depending on the desired configuration, processor 256 can be any type of processor including, but not limited to, a microprocessor (µP), a microcontroller (µC), a digital signal processor (DSP), or any combination thereof. Furthermore, system memory 258 can be of any type of memory now known or later developed including but not limited to volatile memory (such as RAM), non-volatile memory (such as ROM, flash memory, etc.) or any combination thereof.

An example computing system 250 may include various other components as well. For example, computing system 250 includes an A/V processing unit 254 for controlling graphical display 252 and speaker 253 (via A/V port 255), one or more communication interfaces 258 for connecting to other computing devices 268, and a power supply 262. Graphical display 252 may be arranged to provide a visual depiction of various input regions provided by user-interface 200, such as the depiction provided by user-interface graphical display 210. Note, also, that user-interface 200 may be compatible with one or more additional user-interface devices 261 as well.

Furthermore, computing system 250 may also include one or more data storage devices 266, which can be removable storage devices, non-removable storage devices, or a combination thereof. Examples of removable storage devices and non-removable storage devices include magnetic disk devices such as flexible disk drives and hard-disk drives (HDD), optical disk drives such as compact disk (CD) drives or digital versatile disk (DVD) drives, solid state drives (SSD), and/or any other storage device now known or later developed. Computer storage media can include volatile and nonvolatile, removable and non-removable media implemented in any method or technology for storage of information, such as computer readable instructions, data structures, program modules, or other data. For example, computer storage media may take the form of RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium now known or later developed that can be used to store the desired information and which can be accessed by computing system 250.

Figure 3:
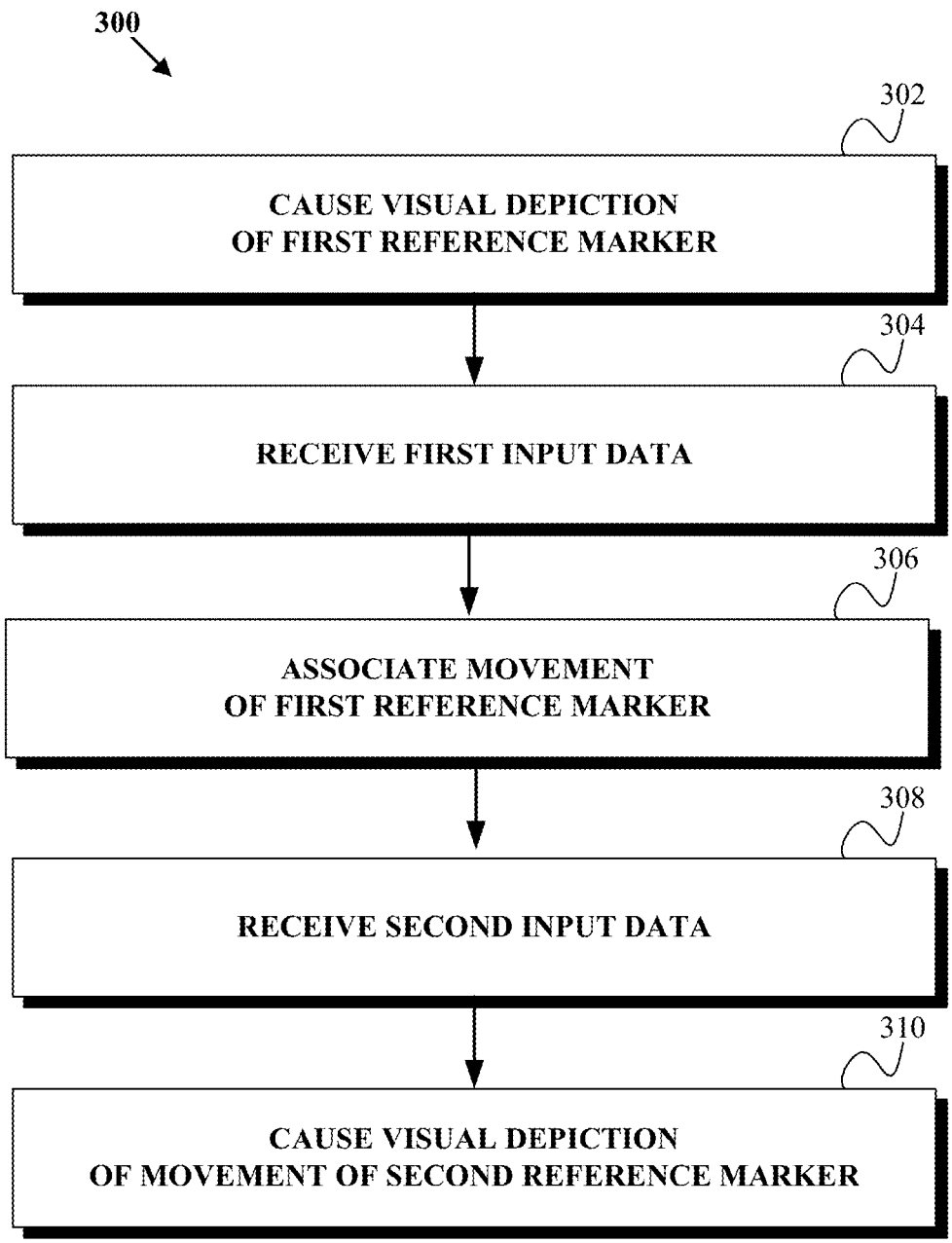
FIG. 3 shows a flowchart depicting an example method for resolving directional ambiguity using touch-based input on a touch-based interface.

According to an example embodiment, computing system 250 may include program instructions that are stored in system memory 258 (and/or possibly in another data-storage medium) and executable by processor 256 to facilitate the various functions described herein including, but not limited to, those functions described with respect to FIG. 3. Although various components of computing system 250 are shown as distributed components, it should be understood that any of such components may be physically integrated and/or distributed according to the desired configuration of the computing system.

3. EXAMPLE METHODS

FIG. 3 shows a flowchart depicting an example method for resolving directional ambiguity with respect to a graphical display that is controlled by a touch-based interface, such as a TouchPad, based on a wake-up gesture. Method 300 may be carried out by a wearable computer and, in particular, by a wearable computer that includes an HMD. However, it should be understood that example methods, such as method 300, may be carried out by devices other than a wearable computer, and/or may be carried out by sub-systems in a wearable computer or in other devices. For example, the example method may alternatively be carried out by a device such as a mobile phone. Other examples are also possible.

Furthermore, those skilled in the art will understand that the flowchart described herein illustrates functionality and operation of certain implementations of example embodiments. In this regard, each block of the flowchart may represent a module, a segment, or a portion of program code, which includes one or more instructions executable by a processor (e.g., processor 256 described above with respect to system 250) for implementing specific logical functions or steps in the process. The program code may be stored on any type of computer readable medium (e.g., computer readable storage medium or non-transitory media, such as memory 258 or storage device 266 described above with respect to system 250), for example, such as a storage device including a disk or hard drive. In addition, each block may represent circuitry that is wired to perform the specific logical functions in the process. Alternative implementations are included within the scope of the example embodiments of the present application in which functions may be executed out of order from that shown or discussed, including substantially concurrent or in reverse order, depending on the functionality involved, as would be understood by those reasonably skilled in the art.

Example method 300 begins at block 302 with causing a visual depiction of a first reference marker on a graphical display. At step 304, the computing system receives data indicating an initial touch input on a touch-based user-interface, where the initial touch input corresponds to an input-direction path having a first end and a second end. In an example embodiment, the computing system may cause a visual depiction of movement of the first reference marker on the graphical display. At step 306, the computing system associates movement of the first reference marker with either subsequent touch inputs from the first end to the second end of input-direction path or the second end to the first end of the input-direction path. In another example embodiment, the computing system may cause a visual depiction of a second reference marker. At step 308, the computing system receives second input data that indicates a subsequent touch input. And at step 310, the computing system causes a visual depiction of movement of a second reference marker based on at least the association of movement of the first reference marker and the subsequent touch input. Each of the blocks shown with respect to FIG. 3 is discussed further below.

a. Cause Visual Depiction of First Reference Marker

Example method 300 begins at block 302 with causing a visual depiction of a first reference marker on a graphical display. Generally, the first reference marker may be displayed by a graphical display that is communicatively coupled to a computing system 250 that is equipped with a user-interface, for example graphical display 252 and user-interface 200. The computing system 250 may provide a visual depiction of the user-interface on the graphical display, including, for example, various input regions, objects, and/or a pointer on the user-interface. In an example embodiment, the graphical display may be positioned orthogonally to the user-interface.

Figure 4A:
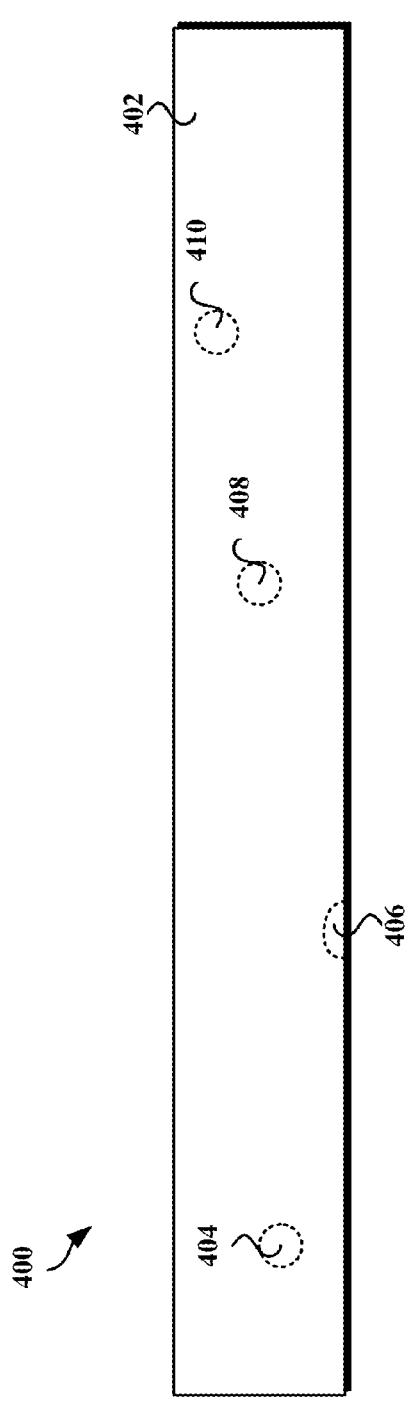
FIG. 4A shows an example system for resolving directional ambiguity using touch-based input on a touch-based interface.

With respect to FIG. 4A, example user-interface 400 is shown. User-interface 400 may take the form of any of the user-interface systems discussed above with respect to FIGS. 1A-1F and 2B. User-interface 400 may take other forms as well. It should be understood that user-interface 400 is shown for purposes of example and explanation only, and should not be taken to be limiting.

FIG. 4A depicts user-interface 400 including surface 402. On surface 402 are numerous locations that may be configured and/or arranged to receive a user's touch input, for example 404, 406, 408, and 410. Other locations (perhaps all) on surface 402 are also available for touch input. Each location may be receptive to a user's touch input, which may involve a tapping motion or swiping motion. Other types of touch inputs may also be possible.

The user-interface 400 may be communicatively coupled to a graphical display. The graphical display may provide a visual depiction of the user-interface, including, for example, a visual depiction of various input regions, objects, and/or a pointer on the user-interface.

Example user-interface 400 is generally arranged as a "TouchPad." It should be understood that the methods described herein may be utilized on TouchPads of various forms or various dimensions.

As noted above, example user-interface 400 may generally be configured to detect, recognize, track, or otherwise sense touch inputs, including input movements, on or along the surface 402. Upon detecting such touch inputs, user-interface 400 may be configured to generate data indicating touch input, which user-interface 400 may generally make available for use by other components of computing system 250, perhaps by way of system bus 264. For example, as generally discussed below, user-interface 400 may transmit data indicating movement to processor 256 for purposes of executing any of the functions described herein, including but not limited to, those functions described with respect to FIG. 3.

Figure 4B:
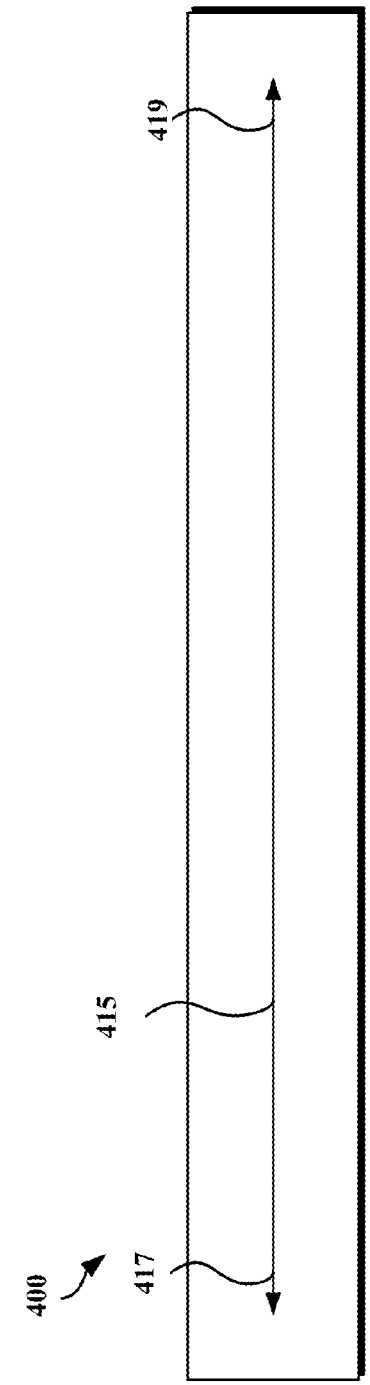
FIG. 4B shows an alternate view of the system illustrated in FIG. 4A.

FIG. 4B depicts user-interface 400 and input-direction path 415. The input-direction path has a first end 417 and a second end 419. The input-direction path 415 may be any length across the surface 402. While input-direction path 415 is depicted horizontally on surface 402 in FIG. 4B, the path may exist in any direction. For example, the input-direction path may travel vertically from the bottom of user-interface 400 to the top of user-interface 400.

Figure 4C:
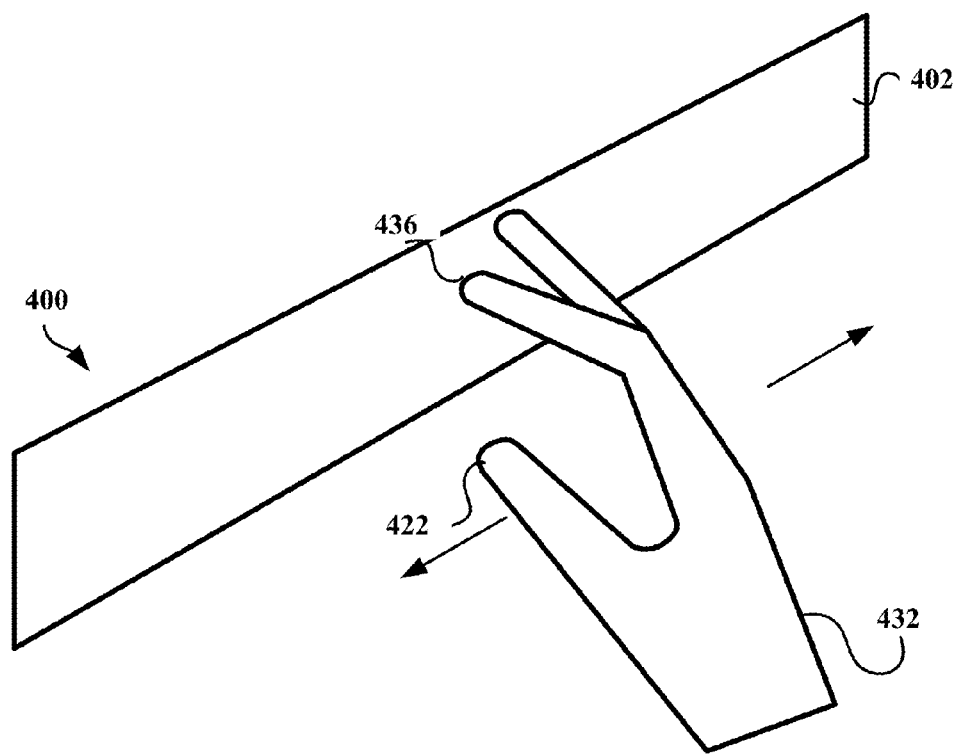
FIG. 4C shows an example system for resolving directional ambiguity using touch-based input on a touch-based interface.
Figure 4D:
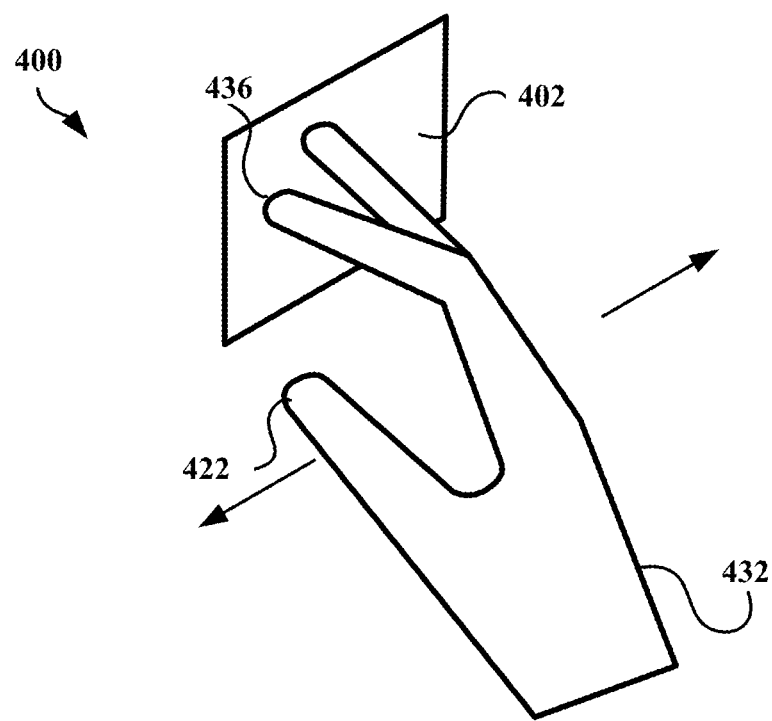
FIG. 4D shows an example system for resolving directional ambiguity using touch-based input on a touch-based interface.

For purposes of explanation, FIGS. 4C and 4D show a user-interface 400 with a user's hand 432. In one embodiment, the index finger 436 or thumb 422, or any other portion of hand 432, may contact the surface 402 of the user-interface 400. The contact with the surface 402 causes an initial touch input. FIGS. 4C and 4D, as demonstrated by the movement arrows adjacent to hand 432, depict the swiping or tapping motions, among other touch inputs, that a user may perform on the surface 402 of the user-interface. The swiping or tapping motions may correspond to the input-direction path 415 discussed above.

In an example embodiment, as depicted in FIG. 4C, the user-interface 400 is a rectangular object, with a length that is longer than the height. In another example embodiment, as depicted in FIG. 4D, the user-interface 400 is a square object, with a length that is equal to the height. Other suitable shapes and sizes of the user-interface 400 may exist.

Figure 5:
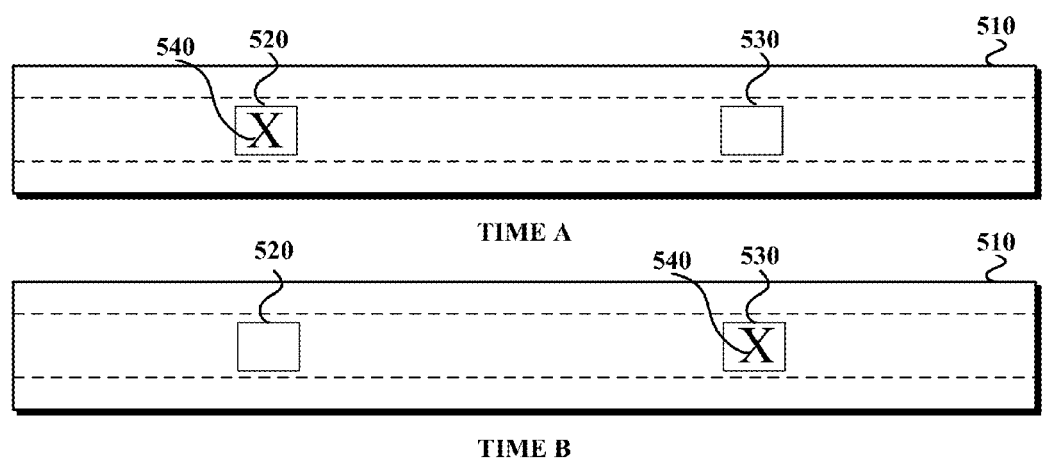
FIG. 5 shows an example graphical display corresponding to use of an example touch-based interface, in accordance with an embodiment.

FIG. 5 depicts a graphical display 510. It should be understood that example graphical display 510 is shown for purposes of example and explanation only, and should not be taken to be limiting. Graphical display 510 may take the form of any of the graphical displays discussed above with respect to FIGS. 1A-1F and 2B. Graphical display 510 may take other forms as well. It should be understood that graphical display 510 is shown for purposes of example and explanation only, and should not be taken to be limiting.

Example graphical display 510 provides a visual depiction of a graphical user-interface associated with user-interface 400 as well as depictions of touch inputs and input movements. As shown in FIG. 5, graphical display 510 may include a first location 520 and a second location 530. The proximity of first location 520 and second location 530 to each other is adjustable and may be determined by the user's touch input on the surface 402 of the user-interface 400. It should be noted that locations 520, 530 are shown for purposes of example and explanation only, and should not be taken as limiting. Further, with reference to the location of movements discussed along with FIG. 4B, an infinite number of locations may exist on graphical display 510.

Additionally, the graphical display is capable of displaying a first reference marker 540 that is depicted as the character "X." The first reference marker may take the form of any object that is capable of being displayed on a graphical display 510, such as a cursor, shape, or image, among other examples.

In one example, the first reference marker 540 depicted on the graphical display 510 is capable of being moved by the user via a touch input as further discussed below. For purposes of explanation, FIG. 5 depicts a TIME A and TIME B, further discussed below, which illustrate movement of the first reference marker 540 from the first location 520 to the second location 530 based on the input data indicating touch inputs received by the computing system 250.

Also, note that after the first reference marker 540 is selected, the computing system may provide an indication that the reference marker has been selected. As one example, providing an indication that the reference marker has been selected may include causing a visual indication to be displayed on the graphical display. Such a visual indication may take the form of the selected reference marker itself. Alternatively, the visual indication may take on some other form such as a visual confirmation, visual signal, and/or any other suitable visual indication.

In an alternative embodiment, providing an indication that the reference marker has been selected may include causing an audible indication played via a speaker. Such an audible indication may be any tone, ring, statement of the selected reference marker, and/or any other suitable audible indication that may be perceived by the user.

b. Receive First Input Data

At block 304, the computing system receives first input data indicating an initial touch input along the surface 402 of the user-interface 400. With reference to FIG. 4C, such an initial touch input may be performed by an index finger 436 or thumb 422 of a user's hand 432. Other fingers or parts of a user's hand may also be used. As indicated by the motion arrows adjacent to the hand 432, the hand 432 may move along the user-interface 400 in such a way that the index finger 436, and thus the initial touch input, may be moved along the surface 402 of the user-interface 400. The user may move the index finger 436 in any direction suitable along the surface 402.

User-interface 400 may include various input areas. As noted above with respect to the discussion of FIG. 4A, user-interface 400 may be configured to receive touch-based user inputs at a variety of locations (including, perhaps, any location) on surface 402. For example, user-interface 400 may be configured to receive user inputs, such as touch inputs 404, 406, 408, and 410, which are entirely within the surface 402. Any suitable location on the surface 402 of the user-interface is acceptable as a location for the initial touch input.

Also, as discussed above, with reference to FIGS. 4B, 4C and 4D, the initial touch input of the user's index finger 436 may correspond to an input-direction path 415 that has a first end 417 and a second end 419. In an embodiment, the initial touch input corresponds to one of movement from the first end 417 to the second end 419. In the depicted example, this movement results in an input-direction path that travels from "left" to "right." In another embodiment, the initial touch input may correspond to a movement from the second end 419 to the first end 417 of the input-direction path. This embodiment results in an input-direction path that travels from "right" to "left."

At TIME B, the user has moved the first reference marker 520, depicted as character "X," to location 530. This movement may occur by a motion of the user's finger along the surface 402 of the user-interface 400. In an example embodiment, the motion of the user's finger is a swiping motion, where the finger remains in contact with the surface 402 of the user-interface 400. Thus, the user's finger may contact the surface 402 at location 520 and swipe their finger to the second location 530, remaining in contact with the surface 402. The swiping motion to location 530 indicates a direction relative to the first location 520.

In another aspect, the motion of the user's finger is a tapping motion, where the finger does not remain in contact with the surface 402 of the user-interface 400. Thus, the user's finger may contact the surface 402 at a location 520, the finger may be removed, and the user may contact the surface 402 again at location 530 with a tapping motion. The tapping motion to location 530 indicates a direction relative to the first location 520.

In another example embodiment, as depicted in FIG. 5, the direction of movement of the first reference marker 540 is from a location 520 on the left side of the graphical display 510 to location 530 on the right side of the graphical display 510. In an alternative embodiment, the user may move the first reference marker 540 from the right side of the graphical display 510 to the left side of the graphical display 510. Other examples of input-direction paths may exist as well, including "up" to "down", "down" to "up," and diagonal.

In one embodiment, the computing system 250 may operate in a first locked state. This locked state may require that the computing system 250 receive a touch input from a user in order to unlock the system. This touch input may generally be in the form of a wake-up gesture, in which there is an initiation of interaction on the user-interface by the user. As described herein, a wake-up gesture may be used to customize movement on a TouchPad. Additionally, the wake-up gesture may be required to "wake-up" the computing system 250. A wake-up gestures performed by a user on a user-interface may take the form of a swipe, a tapping motion, or a series of touch commands. Numerous embodiments of suitable wake-up gestures may exist.

For example, a first reference marker 540 may be displayed on the graphical display. In order to unlock the computing system 250, the user may be required to move the first reference marker 540 using touch input on the Touch-Pad. Once the first reference marker is moved, which may be based on the input-direction path 415 of the touch input, the computing system 250 can operate in a second state in which the computing system is unlocked and can receive subsequent touch inputs.

In one embodiment, while the computing system 250 is operating in the second unlocked state, the computing system detects a transition event. In one example, the transition event may take the form of a timer corresponding to interactions with the touch-based user-interface 400. In other words, if the computing system 250 does not receive a touch input by the user after a predetermined period of time, the computing system may detect the expired timer and transition the computing system 250 back to the first (i.e., locked) state.

Figure 6A:
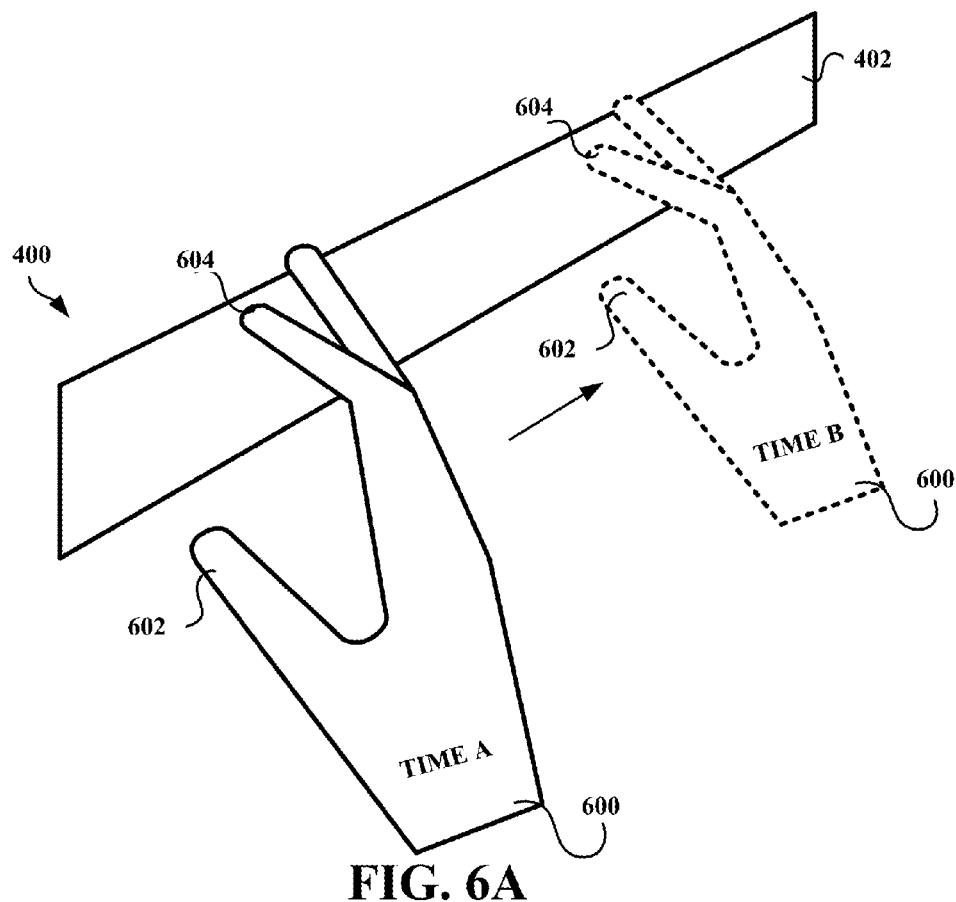
FIG. 6A shows a first example use of an example touch sensitive surface, in accordance with an embodiment.

For purposes of explanation, FIG. 6A depicts examples of an initial touch input corresponding to an input-direction path on a user-interface 400. User-interface 400 has a surface 402 which may be used by the user to perform the initial touch input. The initial touch input may generally be performed by a user's finger 604, thumb 602, or other portion of the user's hand 600.

As shown in FIG. 6A, hand 600 may move along surface 402 of user-interface 400 as illustrated by the movement arrows adjacent to hand 600. The movement arrows are depicted in FIG. 6A as examples and should not be taken as limiting. The user may move user hand 600 such that it begins at a first position at TIME A, and moves to a second position at TIME B. As described above, a user may swipe or tap hand 600 on surface 400 to perform the initial touch input.

Figure 6B:
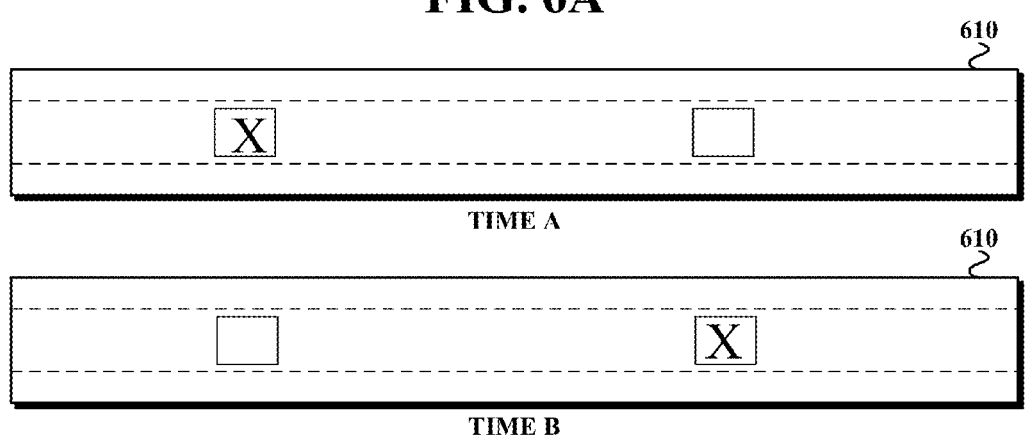
FIG. 6B shows a first example graphical display corresponding to use of the example touch-based interface shown in FIG. 6A, in accordance with an embodiment.

In accordance with FIG. 6A, FIG. 6B depicts graphical display 610, which provides a visual depiction of the initial touch input performed on user-interface 400 described above. Graphical display 600 may be communicatively coupled to user-interface 400. As shown in FIG. 6B, the graphical display 610 includes, among other things, a first reference marker illustrated as character "X" at a first location in TIME A. Also, the graphical display 610 includes a first reference marker illustrated as character "X" at a second location in TIME B.

Thus, as a user performs an initial touch input on surface 402 according to FIG. 6A, the first reference marker moves from the first location at TIME A to the second location at TIME B on the graphical display 610. In one aspect, the user may perform an initial touch input on the surface 400 that has a direction input path moving "left" to "right." This may cause the first reference marker visually depicted on the graphical display 610 to move from "left" to "right." In another aspect, the "left" to "right" input path corresponding to the initial touch input on surface 402 may cause the first reference marker on the graphical display 610 to move from "right" to "left." Other directional relationships between the initial touch input and the movement of the visual depiction of the first reference marker may be available.

c. Associate Movement of First Reference Marker

At step 306, based on the input-direction path with a first end and a second end generated by the initial touch input, the computing system associates the movement of the first reference marker from a first end to a second end of the graphical display with subsequent touch inputs from a user on a user-interface. The subsequent touch inputs may be from the first end to the second end of the input path if the initial touch input was from the first end to the second end of the input path or from the second end to the first end of the input path if the initial touch input was from the second end to the first end of the input path.

Thus, the association allows a user to resolve directional ambiguity between the user-interface 400 and the graphical display 510 for subsequent touch inputs on the user-interface 400. In turn, when a user performs an initial touch input on a TouchPad, the computing system associates the directional movement performed on the TouchPad with the directional movement of the reference marker that occurred on a graphical display, and stores that information for subsequent touch inputs that involve movement of a marker on a display.

In an example embodiment, the computing system 250 may associate the movement of the first reference marker 540 from a first location 520 to a second location 530 on the graphical display 510 with a movement from a first end 417 to a second end 419 of the input-direction path 415 by a user on the user-interface 400. In the described example, the movement of the first reference marker may be depicted by a "left" to "right" movement when the user performs an initial touch input with an input-direction path that travels from "front" to "back." Thus, the computing system 250 associates all subsequent "front" to "back" input-direction paths performed by a user on the user-interface 400 with the "left" to "right" direction of movement of the first reference marker.

In another aspect, the computing system 250 may associate the movement of the first reference marker 540 from a first location 520 to a second location 530 on the graphical display 510 with a movement from a second end 419 to a first end 417 of the input-direction path 415 by a user on the user-interface 400. In the described example, the movement of the first reference marker may be depicted by a "left" to "right" movement when the user performs an initial touch input with an input-direction path that travels from "back" to "front." Thus, the computing system 250 associates all subsequent "back" to "front" input-direction paths performed by a user on the user-interface 400 with the "left" to "right" direction of movement of the first reference marker.

In one embodiment, the graphical display may optionally cause, based on the computing system, a visual depiction of a second reference marker on a graphical display. Similar to the first reference marker discussed above, the second reference marker may be depicted as other objects, such as numbers, symbols, cursors, characters, or graphics. In one aspect, the second reference marker need not be involved in the wake-up command for the computing system 250. Rather, the second reference marker may be visually displayed during any point of use of the computing system 250.

d. Receive Second Input Data

Similar to block 304 described above, the computing system 250 receives subsequent input data indicating a second touch input along the surface 402 of user-interface 400 at block 308. A subsequent touch input may be performed in manners similar to those described above with respect to the initial touch input.

The subsequent touch input by a user on surface 402 may have an input-direction path of any direction and may be performed at any location on the user-interface 400. Additionally, in one aspect, the subsequent touch input may occur once the computing system 250 is operating in the second state described above.

e. Cause Visual Depiction of Movement of Second Reference Marker

Utilizing the association discussed above that was formed between a user's initial touch input on a user-interface and the directional movement of a first reference marker on a graphical display, the computing system may cause a visual depiction of movement of a second reference marker on the graphical display based on subsequent touch input. In other words, the resolution of the directional ambiguity may be applied to subsequent user touch inputs to move objects depicted on the graphical display. For example, a user that swipes "front" to "back" on the user-interface will move objects on the graphical display from "left" to "right" or "right" to "left" based on which direction the first reference marker moved as a result of the input-direction path of the initial touch input.

In an alternative embodiment, at step 310, the computing system 250 causes, based on the association of movement of the first reference marker and a subsequent touch input, a visual depiction of movement of the second reference marker on the graphical display 510. Upon detection of the subsequent touch input and/or input-movement, user-interface 400 may be configured to generate data indicating the respective touch input and/or input movement, which user-interface 400 may then generally make available for use by other components of computing system 250, perhaps by way of system bus 264. Thus, the computing system 250 may move the second reference marker based on the movement of the first reference marker and the subsequent touch input received from the user-interface 400.

Figure 7A:
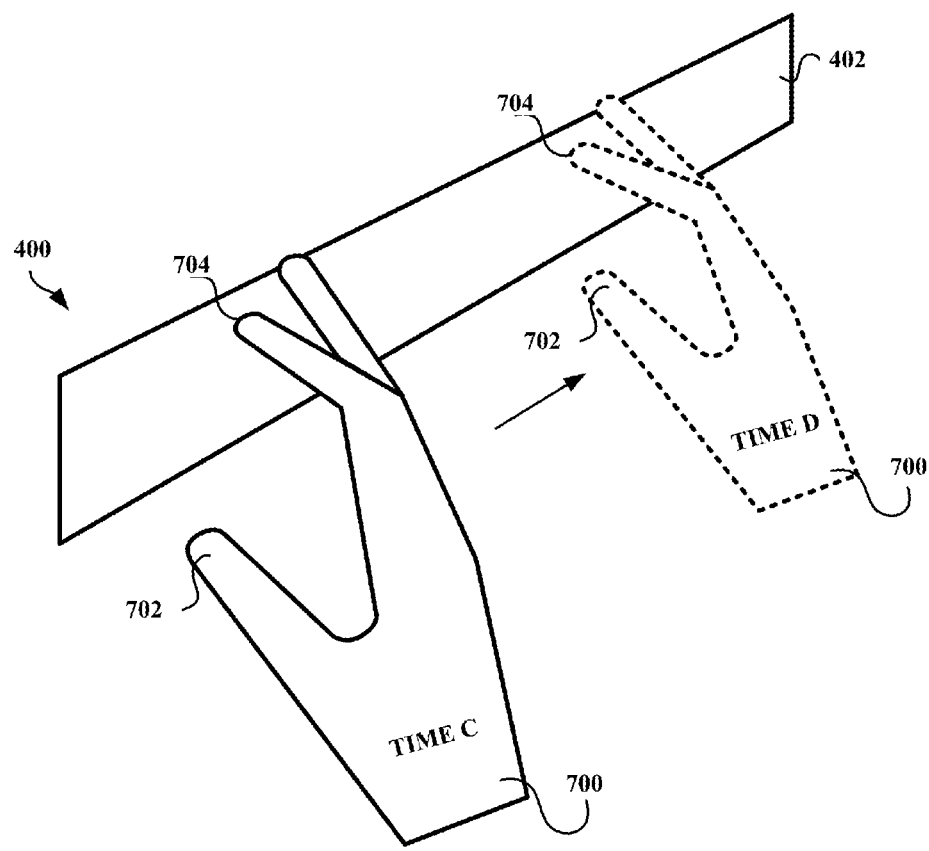
FIG. 7A shows a second example use of an example touch-based interface, in accordance with an embodiment.
Figure 7B:
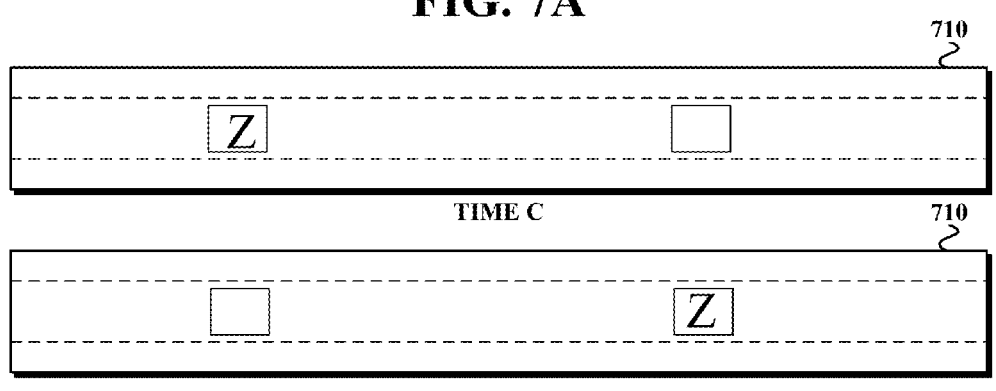
FIG. 7B shows a second example graphical display corresponding to use of the example touch-based interface shown in FIG. 7A, in accordance with an embodiment.

For example, FIGS. 7A and 7B illustrate an embodiment where the computing system 250 will correlate the association of movement of the first reference marker and a subsequent touch input on a touch-based user-interface 400 based on with a command to move the second reference marker illustrated as character "Z" on the graphical display 510. Those of skill in the art will appreciate that other manners, methods, and/or examples of moving visual images and/or computing commands may be possible as well.

FIG. 7A depicts examples of a subsequent touch input and an input-direction path on a user-interface 400. As shown in FIG. 7A, hand 700 may move along user-interface 400 such that it is in a first position at TIME C, and in a second position at TIME D. A user may swipe or tap hand 700 to move a second reference marker illustrated as the character "Z" on a graphical display 510.

FIG. 7B depicts graphical display 710, which provides a visual depiction of a graphical user-interface associated with user-interface 400 as well as depictions of a subsequent touch input and an subsequent input-direction path discussed with respect to FIG. 7A. As shown in FIG. 6B, the graphical user-interface of graphical display 610 includes, among other things, a first reference marker illustrated as character "Z" at a first location in TIME C. Generally, a user may select and move the second reference marker using an initial touch input on the user-interface 400. Thus, for example, at TIME C the user has selected the first reference marker illustrated as character "Z" at a first location and swiped over to a second location illustrated by TIME D, thus moving the second reference marker.

Recall that in the example illustrated in FIGS. 6A and 6B, a user's movement on the user-interface 400 from "left" to "right" on the surface 402 caused the first reference marker to move left to right on the graphical display 510. Thus, based on the association discussed above, a user's subsequent movement from left to right on the surface 402 would cause the second reference marker to move from left to right on the graphical display 710 in FIGS. 7A and 7B.

4. CONCLUSION

While various example aspects and example embodiments have been disclosed herein, other aspects and embodiments will be apparent to those skilled in the art. The various example aspects and example embodiments disclosed herein are for purposes of illustration and are not intended to be limiting, with the true scope and spirit being indicated by the following claims.

We claim:

1. A method comprising:
   displaying on a graphical display of a wearable computing device, a first reference marker and indication to move the first reference marker in a predetermined direction on the graphical display to wake up the wearable computing device;
   while the first reference marker is displayed, receiving first input data indicating an initial swipe gesture on a touch-based user-interface that is separate from and non-parallel to the graphical display;
   in response to the receipt of the first input data indicating the initial swipe gesture:
   (a) regardless of a direction of the initial swipe gesture on the touch-based user-interface, moving the first reference marker in the predetermined direction on the graphical display and waking up the wearable computing device;
   (b) determining whether the initial swipe gesture is performed in either: (i) a first direction along the touch-based user-interface, or (ii) a second direction along the touch-based user-interface, wherein the second direction is substantially opposite of the first direction;
   (c) if the initial swipe gesture is performed in the first direction on the touch-based user-interface, then setting a touch-association parameter to associate subsequent touch input in the first direction on the touch-based user-interface with movement of graphics in the predetermined direction on the graphical display and to associate subsequent touch input in the second direction on the touch-based user-interface with movement of graphics in a direction opposite of the predetermined direction on the graphical display; and
   (d) otherwise, if the initial swipe gesture is performed in the second direction on the touch-based user-interface, then setting the touch-association parameter to associate subsequent touch input in the second direction on the touch-based user-interface with movement of graphics in the predetermined direction on the graphical display and to associate subsequent touch input in the first direction on the touch-based user-interface with movement of graphics in a direction opposite of the predetermined direction on the graphical display;
      receiving second input data indicating a subsequent touch input; and
      causing movement of a second reference marker on the graphical display based on at least (i) the association indicated by the touch-association parameter and (ii) a direction of movement of the subsequent touch input on the touch-based user-interface.

2. The method of claim 1, wherein the first reference marker is a graphical object.

3. The method of claim 1, further comprising:
   before receiving the initial swipe gesture, operating in a first mode in which no association exists between the movement of the first reference marker and the initial swipe gesture on the touch-based user-interface; and
   after receiving the swipe gesture, operating in a second mode in which the touch-based user-interface is configured to receive second input data indicating subsequent touch inputs.

4. The method of claim 3, wherein the first mode is a locked mode in which the touch-based user-interface is configured to receive only the first input data indicating the initial touch input.

5. The method of claim 3, further comprising:
   while operating in the second mode, detecting a transition event; and
   responsive to detecting the transition event, transitioning to operating in the first mode.

6. The method of claim 5, wherein detecting the transition event comprises determining that a timer of the touch-based user-interface has expired.

7. The method of claim 1, carried out on a head-mounted display (HMD).

8. The method of claim 7, wherein the touch-based user-interface is attached to the HMD.

9. The method of claim 8, wherein the HMD comprises at least one lens element, and wherein the graphical display is integrated into the at least one lens element.

10. The method of claim 9, wherein the head-mounted display further comprises at least one extending side-arm, and wherein the touch-based user-interface is attached to one of the at least one extending side-arm.

11. The method of claim 9, wherein the graphical display is arranged substantially orthogonally to the touch-based user-interface.

12. A wearable head-mounted display (HMD) comprising:
   means for displaying on a graphical display of a wearable computing device, a first reference marker and indication to move the first reference marker in a predetermined direction on the graphical display to wake up the wearable computing device;
   means for while the first reference marker is displayed, receiving first input data indicating an initial swipe gesture on a touch-based user-interface that is separate from and non-parallel to the graphical display;
   means for, in response to the receipt of the first input data indicating the initial swipe gesture:
   (a) regardless of a direction of the initial swipe gesture on the touch-based user-interface, moving the first reference marker in the predetermined direction on the graphical display and waking up the wearable computing device;
   (b) determining whether the initial swipe gesture is performed in either: (i) a first direction along the touch-based user-interface, or (ii) a second direction along the touch-based user-interface, wherein the second direction is substantially opposite of the first direction;
   (c) if the initial swipe gesture is performed in the first direction on the touch-based user-interface, then setting a touch-association parameter to associate subsequent touch input in the first direction on the touch-based user-interface with movement of graphics in the predetermined direction on the graphical display and to associate subsequent touch input in the second direction on the touch-based user-interface with movement of graphics in a direction opposite of the predetermined direction on the graphical display; and (d) otherwise, if the initial swipe gesture is performed in the second direction on the touch-based user-interface, then setting the touch-association parameter to associate subsequent touch input in the second direction on the touch-based user-interface with movement of graphics in the predetermined direction on the graphical display and to associate subsequent touch input in the first direction on the touch-based user-interface with movement of graphics in a direction opposite of the predetermined direction on the graphical display;

means for receiving second input data indicating a subsequent touch input; and means for causing movement of a second reference marker on the graphical display based on at least (i) the association indicated by the touch-association parameter and (ii) a direction of movement of the subsequent touch input on the touch-based user-interface.

13. The HMD of claim 12, wherein the touch-based user-interface is attached to the head-mounted display.

14. The HMD of claim 12, wherein the head-mounted display comprises at least one lens element, and wherein the graphical display is integrated into the at least one lens element.

15. The HMD of claim 14, wherein the head-mounted display further comprises at least one extending side-arm, and wherein the touch-based user-interface is attached to one of the at least one extending side-arm.

16. The HMD of claim 14, wherein the graphical display is arranged substantially orthogonally to the touch-based user-interface on a head-mounted display.

17. A non-transitory computer-readable medium having instructions stored thereon comprising:

displaying on a graphical display of a wearable computing device, a first reference marker and indication to move the first reference marker in a predetermined direction on the graphical display to wake up the wearable computing device;

while the first reference marker is displayed, receiving first input data an initial swipe gesture on a touch-based user-interface that is separate from and non-parallel to the graphical display;

in response to the receipt of the first input data indicating the initial swipe gesture:

(a) regardless of a direction of the initial swipe gesture on the touch-based user-interface, moving the first reference marker in the predetermined direction on the graphical display and waking up the wearable computing device;

(b) determining whether the initial swipe gesture is performed in either: (i) a first direction along the touch-based user-interface, or (ii) a second direction along the touch-based user-interface, wherein the second direction is substantially opposite of the first direction;

(c) if the initial swipe gesture is performed in the first direction on the touch-based user-interface, then setting a touch-association parameter to associate subsequent touch input in the first direction on the touch-based user-interface with movement of graphics in the predetermined direction on the graphical display and to associate subsequent touch input in the second direction on the touch-based user-interface with movement of graphics in a direction opposite of the predetermined direction on the graphical display; and (d) otherwise, if the initial swipe gesture is performed in the second direction on the touch-based user-interface, then setting the touch-association parameter to associate subsequent touch input in the second direction on the touch-based user-interface with movement of graphics in the predetermined direction on the graphical display and to associate subsequent touch input in the first direction on the touch-based user-interface with movement of graphics in a direction opposite of the predetermined direction on the graphical display;

receiving second input data indicating a subsequent touch input; and causing movement of a second reference marker on the graphical display based on at least (i) the association indicated by the touch-association parameter and (ii) a direction of movement of the subsequent touch input on the touch-based user-interface.

18. The non-transitory computer readable medium of claim 17, wherein the first reference marker is a graphical object.

19. A system comprising:

a processor;

a non-transitory computer readable medium; and program instructions stored on the non-transitory computer readable medium and executable by the processor to cause a computing device to:

display, on a graphical display of a computing device, a first reference marker and indication to move the first reference marker in a predetermined direction on the graphical display to wake up the computing device;

while the first reference marker is displayed, receive first input data indicating an initial swipe gesture on a touch-based user-interface that is separate from and non-parallel to the graphical display;

in response to the receipt of the first input data indicating the initial swipe gesture:

(a) regardless of a direction of the initial swipe gesture on the touch-based user-interface, move the first reference marker in the predetermined direction on the graphical display and wake up the wearable computing device;

(b) determine whether the initial swipe gesture is performed in either: (i) a first direction along the touch-based user-interface, or (ii) a second direction along the touch-based user-interface, wherein the second direction is substantially opposite of the first direction;

(c) if the initial swipe gesture is performed in the first direction on the touch-based user-interface, then set a touch-association parameter to associate subsequent touch input in the first direction on the touch-based user-interface with movement of graphics in the predetermined direction on the graphical display and to associate subsequent touch input in the second direction on the touch-based user-interface with movement of graphics in a direction opposite of the predetermined direction on the graphical display; and (d) otherwise, if the initial swipe gesture is performed in the second direction on the touch-based user-interface, then set the touch-association parameter to associate subsequent touch input in the second direction on the touch-based user-interface with movement of graphics in the predetermined direction on the graphical display and to associate subsequent touch input in the first direction on the touch-based user-interface with movement of graphics in a direction opposite of the predetermined direction on the graphical display;

receive second input data indicating a subsequent touch input; and cause movement of a second reference marker on the graphical display based on at least (i) the association indicated by the touch-association parameter and (ii) a direction of movement of the subsequent touch input on the touch-based user-interface.

20. The system of claim 19, wherein the system further comprises a head-mounted display (HMD).

21. The system of claim 20, wherein the touch-based user-interface is attached to the HMD.

22. The system of claim 21, wherein the HMD further comprises at least one lens element, and wherein the graphical display is integrated into the at least one lens element.

23. The system of claim 21, wherein the head-mounted display further comprises at least one extending side-arm, and wherein the touch-based user-interface is attached to one of the at least one extending side-arm.

24. The system of claim 21, wherein the graphical display is arranged substantially orthogonally to the touch-based user-interface.

* * * * *